(12) United States Patent
Shtarkman et al.

(10) Patent No.: US 6,196,528 B1
(45) Date of Patent: Mar. 6, 2001

(54) SPACECRAFT ANTENNA VIBRATION CONTROL DAMPER

(75) Inventors: Emil M. Shtarkman, Marina Del Rey; Kathleen M. Doherty, Rancho Palos Verdes; A. Dale Parker, Rolling Hills Estates, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/525,883

(22) Filed: Mar. 15, 2000

Related U.S. Application Data

(62) Division of application No. 09/076,637, filed on May 12, 1998, now Pat. No. 6,082,719.

(51) Int. Cl.[7] ................................................. F16M 1/00
(52) U.S. Cl. .................... 267/140.14; 267/35; 267/118; 188/312
(58) Field of Search .................... 267/140.14, 140.15, 267/35, 219; 180/300, 312

(56) References Cited

U.S. PATENT DOCUMENTS

| | | |
|---|---|---|
| 4,259,825 | 4/1981 | Hedgepeth et al. . |
| 4,578,920 | 4/1986 | Bush et al. . |
| 4,819,399 | 4/1989 | Onoda . |
| 4,869,476 | 9/1989 | Shtarkman . |
| 4,896,752 | 1/1990 | Shtarkman . |
| 4,942,947 | 7/1990 | Shtarkman . |
| 4,958,474 | 9/1990 | Adams . |
| 4,992,190 | 2/1991 | Shtarkman . |
| 5,022,272 | 6/1991 | Bronowicki et al. . |
| 5,167,850 | 12/1992 | Shtarkman . |
| 5,176,368 | 1/1993 | Shtarkman . |
| 5,257,681 | 11/1993 | Shtarkman et al. . |
| 5,305,507 | 4/1994 | Dvorsky et al. . |
| 5,354,488 | 10/1994 | Shtarkman et al. . |
| 5,366,211 * | 11/1994 | Hamada et al. ................ 267/140.15 |
| 5,367,459 | 11/1994 | Shtarkman et al. . |
| 5,424,596 | 6/1995 | Mendenhall et al. . |
| 5,517,096 | 5/1996 | Shtarkman et al. . |
| 5,525,853 | 6/1996 | Nye et al. . |
| 5,655,757 | 8/1997 | Starkovich et al. . |
| 5,957,440 * | 9/1999 | Jones et al. ..................... 267/140.15 |
| 6,068,249 * | 5/2000 | Shtarkman ....................... 267/140.15 |

OTHER PUBLICATIONS

"An Actively Damped Passenger Car Suspension System With Low Voltage Electro–Rheological Magnetic Fluid", Andrew Pinkos, Emil Shtarkman, and Thomas Fitzgerald, SAE International Congress and Exposition, Detroit, Michigan, Mar. 1–5, 1993.

* cited by examiner

Primary Examiner—Christopher P. Schwartz
(74) Attorney, Agent, or Firm—Michael S. Yatsko

(57) ABSTRACT

A vibration control system is provided for an appendage such as an antenna 10 coupled to a platform such as a spacecraft 12. The antenna 10 is coupled at a base 14 so as to extend from the spacecraft 12. A plurality of guidelines 20 extend between remote portions 22 of the antenna 10 and the antenna base 14. A plurality of motion control elements 36 are provided within the antenna structure for reducing oscillation settling time of the antenna 10 relative to the spacecraft 12. The motion control elements 36 include a material disposed therein having its damping response changed according to the magnitude of an electric or magnetic field applied thereto.

10 Claims, 4 Drawing Sheets

SPACECRAFT ANTENNA VIBRATION CONTROL DAMPER

This application is a divisional of application Ser. No. 09/076,637, filed May 12, 1998, now U.S. Pat. No. 6,082,719.

BACKGROUND OF THE INVENTION

1. Technical Field

The present invention generally relates to motion control mechanisms and, more particularly, to an apparatus for controlling the vibration of an appendage which results from the slewing of a spacecraft or other disturbances.

2. Discussion

Spacecraft are commonly provided with deployable antennas, test equipment, and other appendages. For example, spacecraft antennas typically comprise a dish-like shaped structure formed about a central feed tower. In one such reflector design, the feed tower is secured to the spacecraft at its base while a reflective mesh structure is supported about the axis of the feed tower by a rib structure. A plurality of cables interconnect the remote portions of the dish-like structure with the base of the feed tower. These cables stabilize the ribs by holding the reflective mesh surface in place.

Spacecraft maneuvers such as slewing (i.e., rotating the spacecraft about its yaw or pitch axis) and/or spacecraft disturbances cause the appendages extending therefrom to undergo undesirable oscillations. Typical large diameter reflective structures possess low natural frequencies (1.0 Hz or less) and inherent structural damping of such systems accounts for approximately 0.1% to 0.4% critical damping. Because of the low damping, the antenna requires a significant amount of time to settle down. Prior to settling, the antenna's mission operation is degraded.

Prior art attempts to reduce oscillations have been directed towards stiffening the overall antenna structure. By stiffening the structure, the natural frequency of the antenna can be increased. As such, the oscillations occur faster and the time required for the vibration displacements to drop to an acceptable level is reduced. One method that has been used to increase natural frequency was to increase the tension in the guidelines extending between the rib structure and the feed tower base. Also, cables have been added from the top edge of the rib structure to the top of the feed tower and the diameter of the ribs has been increased. However, these attempts have been only modestly effective as the natural frequency cannot be increased to a sufficient level without adding significant weight to the structure.

Motion control mechanisms for damping oscillations have been used to various degrees in the automotive industry. For instance, U.S. Pat. No. 4,869,476 entitled "Electrically Controlled Viscous Elastic Spring" to Shtarkman and assigned to the Assignee of the present invention and incorporated by reference herein describes a spring for resisting relative movement of parts and for urging the parts to an initial, equilibrium position when the parts are moved therefrom. The spring uses a fluid, such as an electro-rheological fluid or a magnetic fluid, to provide a variable spring rate and a variable load-carrying capacity. The resistance to flow of these fluids varies as a function of the magnitude of either an electric field or a magnetic field applied to the fluid.

Another known device using electro-rheological fluid for damping is disclosed in U.S. Pat. No. 4,896,752 entitled "Vehicle Strut" to Shtarkman and assigned to the Assignee of the present invention which is also incorporated by reference herein. This reference discloses a strut for use in a suspension system wherein the spring and damping characteristics of the strut are controlled, in part, by an electro-rheological fluid disposed within fluid chambers in the strut. When the viscosity of the fluid is varied by changing the magnitude of the electric field applied to the fluid, the spring rate of the strut is varied.

Further, U.S. Pat. Nos. 4,942,947, 4,992,190, 5,167,850, and 5,176,368, all to Shtarkman, and 5,257,681, 5,354,488, 5,367,459, 5,517,096, and 5,655,757 all to Shtarkman, et al., each of which is assigned to the Assignee of the present invention and is incorporated by reference herein, disclose devices utilizing fluid compositions which are responsive to an electric or magnetic field. By controlling the magnitude of the field, the spring and damping characteristics of the devices can be manipulated.

In view of the foregoing, it would be desirable to provide an apparatus for controlling the vibrations of a spacecraft appendage by utilizing a control mechanism responsive to an electric or magnetic field.

SUMMARY OF THE INVENTION

The above and other objects are provided by a motion control apparatus for controlling oscillations of an appendage such as an antenna coupled to a platform such as a spacecraft. The antenna is secured to the spacecraft at its base so as to extend laterally from the spacecraft. A plurality of guidelines extend between remote portions of the antenna's reflector structure and the antenna base. When the reflector is subjected to lateral forces due to a slew maneuver of the spacecraft or other disturbances, the guidelines react to the lateral loads. When the reflector oscillates in its first lateral mode, the guidelines experience a significant portion of the strain energy for that mode, as does the feed tower. Therefore, in order to reduce the settling time of the antenna relative to the spacecraft, a plurality of motion control elements are provided between the antenna base and the spacecraft, along the guidelines between the antenna base and the remote portions of the antenna or both.

The motion control elements preferably comprise either passive or active control elements and include a material having a damping response changed according to the magnitude of an electric or magnetic power source coupled therewith. For instance, the motion control elements may include a magneto- or electro-rheological fluid having its viscosity changed according to the magnitude of an electric or magnetic field applied thereto. Also, the motion control elements may include a piezo-electric stack which exert mechanical force proportional to the magnitude of an electric field supplied thereto. As such, the piezo-electric stack induces a force counteractive to the sensed force which results in damping in a structure.

In a first embodiment, the vibration control mechanism comprises a combination of a piezo-electric stack and electro- or magneto-rheological fluid interposed between an outer housing secured to an anchor and an inner housing secured to an object to be vibrationally controlled.

In a second embodiment the vibration control mechanism of the present invention comprises a piezo-electric stack interposed between an outer housing secured to an anchor and an inner housing secured to an object to be vibrationally controlled.

In a third embodiment, the vibration control mechanism of the present invention comprises an electro- or magneto-rheological fluid interposed between a housing and an inner housing coupled at a first end to an anchor and at a second end to an object to be vibrationally controlled.

In a fourth embodiment the vibration control mechanism of the present invention comprises an electro- or magneto-rheological fluid disposed within an inner housing having flexible bellows type side walls and being fixed at one end to an anchor and at another end to an object to be vibrationally controlled.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENT(S)

The present invention is directed towards a motion control apparatus for decreasing the settling time of a spacecraft appendage after it experiences vibration due to spacecraft maneuvers or other disturbances. According to the present invention, a motion control element is interposed between the appendage base and the spacecraft and/or along guidelines between the appendage base and remote portions of the appendage. The motion control elements preferably comprise either passive or active control elements and include a material having a damping response changed according to the magnitude of an electric or magnetic power source coupled thereto.

Figure 1:
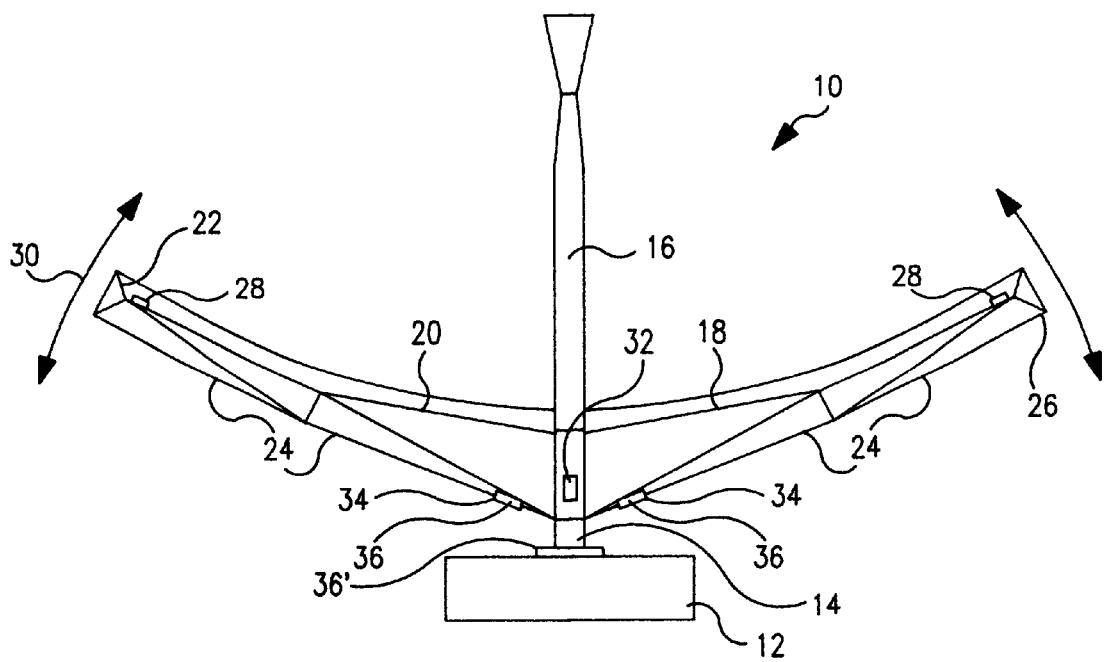
FIG. 1 is a schematic side-elevation view of a spacecraft antenna extending from a spacecraft and incorporating the vibration control mechanism according to the present invention.

Turning now to the drawing figures, FIG. 1 illustrates a motion control system according to one preferred embodiment of the present invention. A spacecraft appendage in the form of an antenna 10 is coupled to a platform in the form of a spacecraft 12, at the antenna base 14. The antenna 10 includes an elongated, tubular feed tower 16 supporting a foldable dish-like structure 18 thereabout. The dish-like structure 18 includes a plurality of radially projecting ribs 20 pivotally coupled at a first end to the feed tower 16 and coupled at a second end to a spreader bar 22. When deployed, the dish-like structure 18 forms a concave reflector opening away from the spacecraft 12.

A plurality of guidelines 24 in the form of cables extend under tension between the antenna base 14 and remote portions 26 of the antenna 10 along the dish-like structure 18. A plurality of sensors 28, such as accelerometers, are periodically disposed on the dish-like structure 18 proximate the remote portions 26 of the antenna 10. The sensors 28 detect oscillations 30 of the antenna 10 relative to the spacecraft 12 as indicated by the double-headed arrows. Further, a deformation sensor 32 is coupled to the base of the feed tower 16 and strain sensors 34 are interposed along the guidelines 24 for detecting the oscillations 30.

A deformation sensor is a sensor/actuator device including a plurality of piezo-electric elements therein. Some of the piezo-electric elements are used in a sensing mode when an electric charge develops proportional to the magnitude of the stress generated by an applied force. Other piezo-electric elements are used in an actuator by generating mechanical forces proportional to the magnitude of an electric field supplied thereto. As such, the deformation sensor 32 can sense the level and frequency of oscillations of the antenna 10 while reacting to damp the same. A more detailed description of the deformation sensor 32 can be found in U.S. Pat. Nos. 5,424,596 entitled "Activated Structure" to Mendenhall et al., 5,525,853 entitled "Smart Structures for Vibration Suppression" to Nye et al., 5,022,272 entitled "Locally Compensated Deformation Sensor" to Bronowicki et al., and 5,305,507 entitled "Method for Encapsulating a Ceramic Device for Embedding in Composite Structures" to Dvorsky et al., assigned to the Assignee of the present invention which are hereby incorporated by reference herein.

In the embodiment illustrated in FIG. 1, a plurality of motion control elements 36 and 36' acting as energy dissipators are aligned along the critical load paths of the antenna 10. More particularly, the motion control elements 36 are interposed in parallel along select guidelines 24 between the antenna base 14 and the remote portions 26 of the antenna 10. If desired, more than one motion control element 36 may be interposed in series along the same guideline 24. Also, at least one other motion control element 36 as 36' is interposed between the antenna base 14 and the spacecraft 12. As described in greater detail below, the motion control elements 36 and 36' actively and/or passively attenuate the oscillating motion 30 of the antenna 10 which may arise as a result of spacecraft maneuvers and/or other disturbances. Because the motion control elements 36 and 36' dissipate the oscillation energy at a higher rate than in their absence, the oscillation motion 30 is quickly settled.

Figure 2:
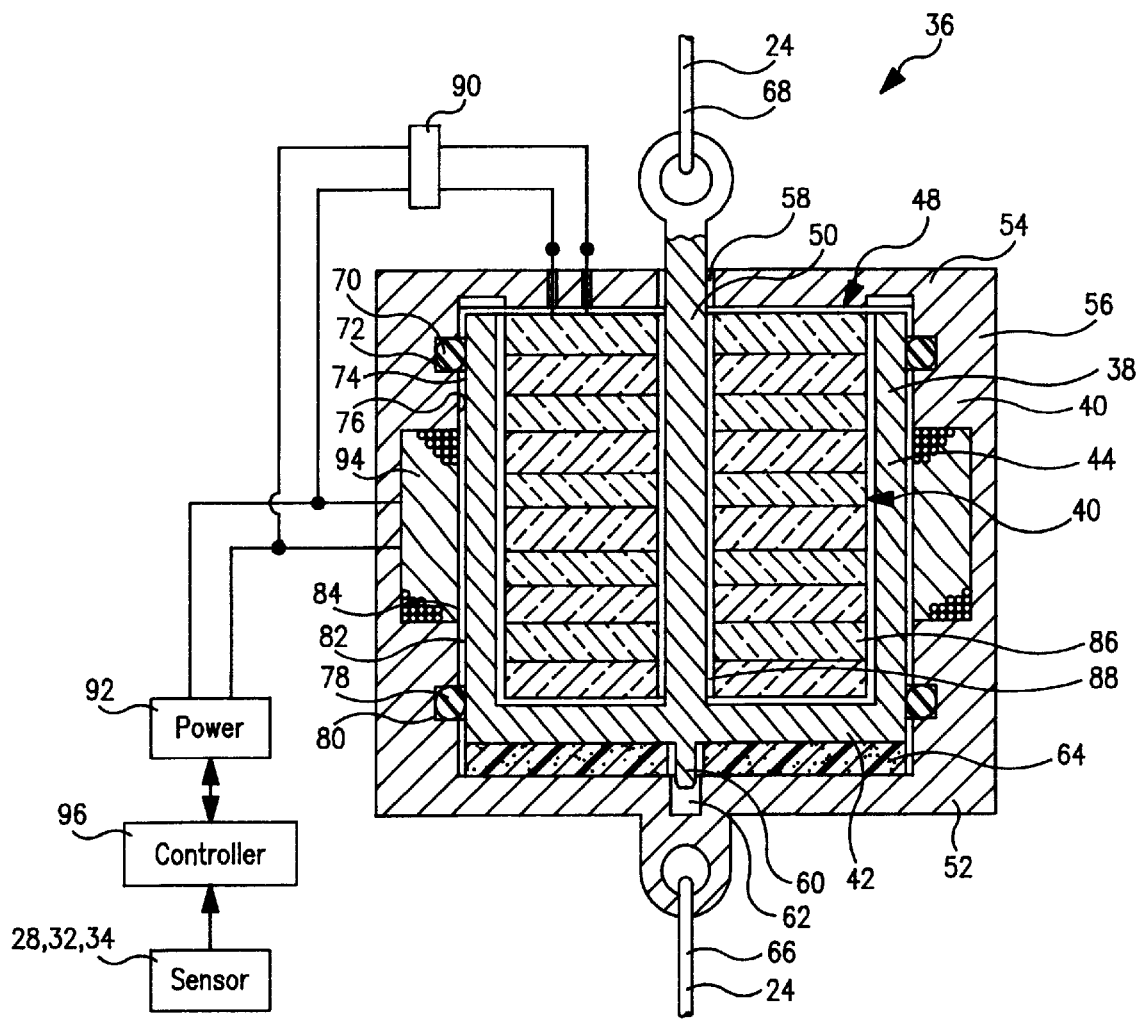
FIG. 2 is a cross-sectional view of a vibration control mechanism according to a first embodiment of the present invention.

Turning now to FIG. 2, an exemplary embodiment of the vibration control element 36 is illustrated. The control element 36 includes an inner housing 38 disposed substantially within an outer housing 40. The inner housing 38 includes a circular base 42 having a cylindrical wall 44 extending orthogonally therefrom. The cylindrical wall 44 defines an inner volume 46 of the inner housing 38 and an opening 48 opposite the base 42. A rod-shaped attachment member 50 is coupled to the base 42 and extends through the inner volume 46 essentially parallel to the cylindrical wall 44 and through the outer housing 40.

The outer housing 40 includes a circular first end 52 and a circular second end 54 interconnected by a cylindrical wall 56. The second end 54 substantially encloses the inner volume 46 of the inner housing 38 by extending across the opening 48. The second end 54 also includes an opening 58 for accommodating the attachment member 50. A guide pin 60 axially projects from the base 42 of the inner housing 38 and is slidingly received in a hole 62 formed in the first end 52 of the outer housing 40. A foam member 64 is interposed between the base 42 of the inner housing 38 and the first end 52 of the outer housing 40 around the guide pin 60 to absorb loads directed on the control element 36. The outer housing 40 is coupled to a first end 66 of cable 24 which is coupled to an anchor such as the feed tower 16 (see FIG. 1). The inner housing 38 is secured to a second end 68 of the cable 24 which is coupled to the object to be damped or the remote portions 26 of the antenna 10.

A first O-ring 70 is nested within a pocket 72 of the outer housing 40 proximate the second end 54 and sealingly engages the outer surface 74 of the inner housing 38 and the inner surface 76 of the outer housing 40. Similarly, a second O-ring 78 is disposed within a second pocket 80 so as to sealingly engage the outer surface 74 of the inner housing 38 and the inner surface 76 of the outer housing 40. In combination, the outer surface 74, inner surface 76 and first and second O-rings 70 and 78 define a fluid chamber 82 between the inner housing 38 and the outer housing 40.

A fluid 84 in the form of an electro- or magneto-rheological fluid is disposed within the fluid chamber 82 such that it contacts the outer surface 74 of the inner housing 38 and the inner surface 76 of the outer housing 40 but is isolated from the inner volume 46 of the inner housing 38 by the first and second O-rings 70 and 78. An electro-rheological fluid is a two-phase material which has its resistance to flow varied as a function of an electric field acting on the fluid. A magneto-rheological fluid is a two-phase material which has its resistance to flow varied as a function of a magnetic field acting on the fluid. Alternatively, a visco-elastic fluid may be used in the motion control elements 36 in combination with or independent of the electro- or magneto rheological fluid. By employing these types of fluids, the spring and damping properties of the motion control element 36 may be variably controlled.

A plurality of donut-shaped piezo-electric elements 86 are stacked within the inner volume 46 of the inner housing 38 between the base 42 and second end 54 of the outer housing 40. Each piezo-electric element 86 includes a central opening 88 formed therethrough for accommodating the attachment member 50. An electric power amplifier 90 is coupled between the piezo-electric elements 86 and a power source 92. Also, an electro-magnet 94 coupled to the power source 92 is disposed in the cylindrical wall 56 of the outer housing 40 proximate the fluid 84. While an electro-magnet 94 is illustrated for use with magneto-rheological fluid 84, it should be appreciated that a coil could substitute therefore for use in conjunction with a fluid of the electro-rheological type. It should also be appreciated that the electro-magnet 94 could be replaced with permanent magnets if fixed motion control characteristics are desired.

The power source 92 is coupled to the piezo-electric elements 86 and the electro-magnet 94 via a controller 96 in the form of a microprocessor. The power source 92 also communicates with one or more of the sensors 28, deformation sensor 32 and/or strain sensors 34 (FIG. 1) by telemetry or a conventional wiring harness. As such, the microprocessor 96 controls the power source 92 in response to signals received from the motion control sensors 28, 32 and/or 34. Preferably, the characteristics of each motion control element 36 disposed within the antenna structure is controlled independently by the microprocessor 96 to counter the lateral forces described above.

The magnetic field from the electro-magnet 94 acts on the magneto-rheological fluid 84 and has a strength proportional to the voltage potential across electro-magnet 94. The resistance to flow of the magneto-rheological fluid 84 is proportional to the strength of the magnetic field applied across the fluid 84. Thus, when the voltage from the power source 92 is varied, the resistance to flow of the magneto-rheological fluid 84 is varied. When the resistance to flow of the magneto-rheological fluid 84 is varied, the damping characteristics of the motion control element 36 are varied. As the resistance to flow of the fluid 84 decreases, the damping rate of the motion control element 36 decreases. Likewise, as the resistance to flow of the fluid 84 increases, the damping rate of the damping element 36 increases. Thus, the motion control characteristics of the motion control element 36 are varied and controlled in response to the magnetic field applied to the fluid 84.

Similarly, the electric charge from the electric power source 92 acts on the piezo-electric elements 86 and has a strength proportional to the voltage from the electric power amplifier 90. The dimensions of the piezo-electric elements 86 are proportional to the strength of the electric charge applied to the elements 86. Thus, when the voltage from the power source 92 is varied, the dimensions of the piezo-electric elements 86 are varied. When the dimensions of the piezo-electric elements 86 are varied, the motion control characteristics of the resistance to lateral forces element 36 are varied. As the dimensions of the elements 86 decrease, the resistance to lateral forces of the motion control 36 decreases. Likewise, as the dimensions of the elements 86 increase, the resistance to lateral forces of the motion control element 36 increases. Thus, the motion control characteristics of the motion control element 36 are varied and controlled in response to the electric charge supplied to the elements 86 in phase with the oscillations of the antenna 10.

As described, one way to vary the strength of the magnetic or electric field applied to the motion control element 36 is to vary the voltage potential across electro-magnet 94 or the charge from the electric power amplifier 90. Another way to vary the strength of the magnetic field applied to the fluid 84 is to change the distance between the electro-magnet 94 and the fluid chamber 82. Also, the size of the magnetic field can be changed by varying the area of the electro-magnet 94 which is in facing relationship. Accordingly, the actual configuration of the motion control element 36 may be selected to provide the desired damping characteristics corresponding to the specific application into which it is incorporated.

Referring now collectively to FIGS. 1 and 2, in active damping control operation, the sensors 28, deformation sensor 32 and/or strain sensors 34 provide electrical signals to the microprocessor 96 indicative of the vibration conditions, i.e., level and frequency, experienced by the antenna 10. In response to the signals, i.e., feedback, the microprocessor 96 provides output signals to control the power source 92. The power source 92 varies the magnitude of the voltage transmitted to the motion control elements 36 and 36' in response to the signals from the sensors 28, 32 and/or 34.

In response to the change in magnetic field, the magneto-rheological fluid 84 changes its viscosity which alters the damping rate between the inner housing 38 and the outer housing 40. Similarly, in response to the change in electric field, the piezo-electric elements 86 alter their dimensions in proportion to the changing electric field from the power source 92. As such, the resistance to change along the length dimension of the motion control elements 36 and 36' changes as the piezo-electric elements 86 and fluid 84 change their dimensions and viscosity respectively. When this is done in phase with the oscillations detected by sensors 28, 32 and/or 34, the settling time of the antenna 10 can be greatly reduced.

As a further alternative, the fluid based motion control element 36 illustrated in FIG. 2 may be replaced by a motion control element including one or more piezo-electric damping elements therein (commonly referred to as a PZT stack). A piezo-electric element exerts a mechanical force proportional to the magnitude of an electric field applied thereto. One skilled in the art will appreciate that a PZT stack's function is substantially identical to that of the active fluid based motion control element 36 described above. A further explanation of PZT stack based motion control elements can be found in co-pending U.S. patent application Ser. No. (Attorney Docket No. 11-0879), entitled: "Spacecraft Antenna Slew Control System", filed concurrently herewith, and assigned to the Assignee of the invention and incorporated by reference herein.

Figure 3:
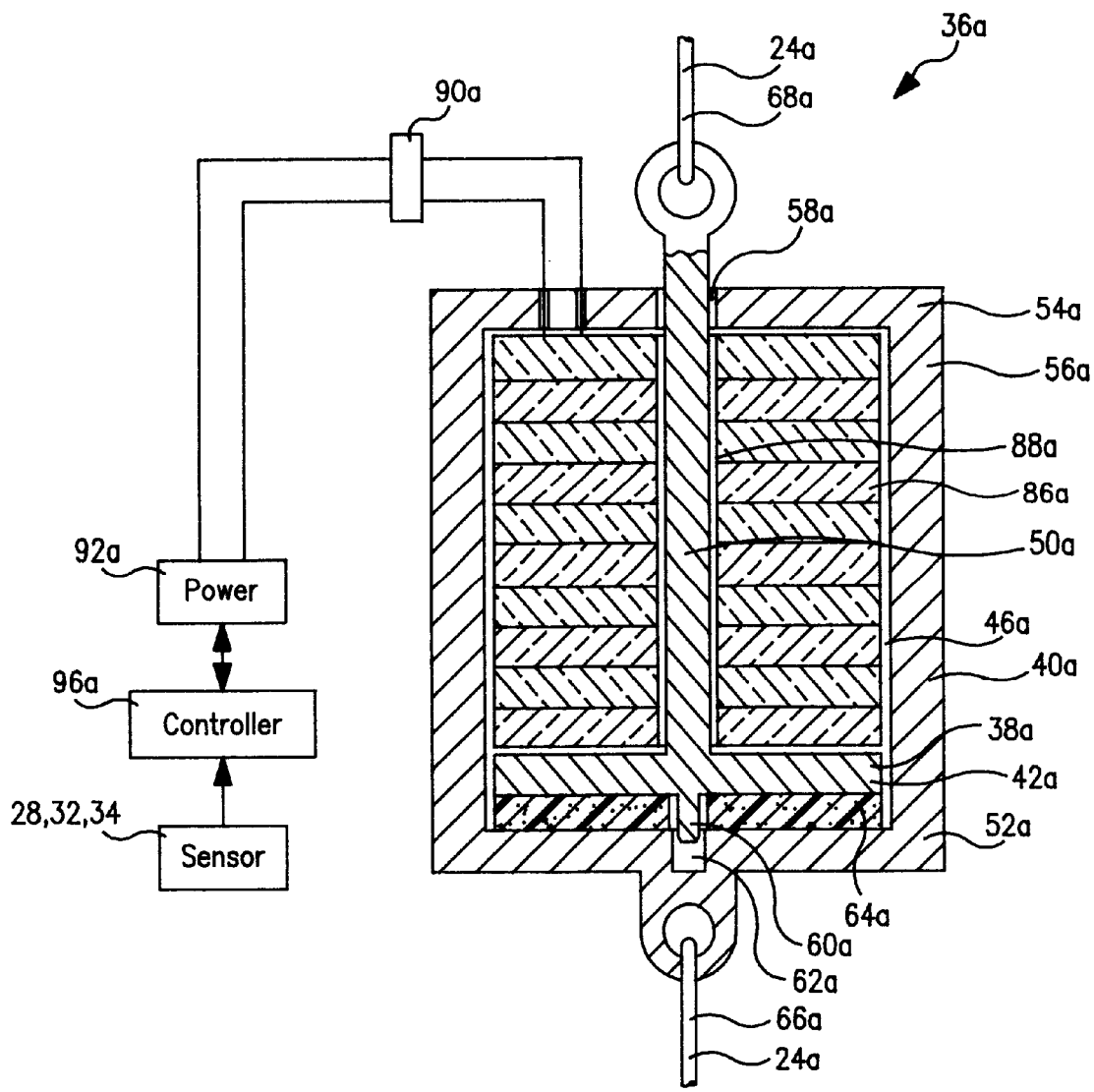
FIG. 3 is a cross-sectional view of a vibration control mechanism according to a second embodiment of the present invention.

Referring now to FIG. 3, a second embodiment vibration control element 36a is illustrated. This embodiment is substantially similar to the embodiment depicted in FIG. 2 with the exception that only the piezo-electric elements 86a are incorporated therein rather than both piezo-electric elements and electro- or magneto-rheological fluid. As such, the elements of the first embodiment dedicated to the electro- or magneto-rheological fluid are omitted. The control element 36a includes an inner member 38a disposed substantially within an outer housing 40a. The inner member 38a includes a circular base 42a defining an inner volume 46a of the control element 36a with the outer housing 40a. A rod-shaped attachment member 50a is coupled to the base 42a and extends through the inner volume 46a essentially perpendicular to the base 42a and through the outer housing 40a.

The outer housing 40a includes a circular first end 52a and a circular second end 54a interconnected by a cylindrical wall 56a. The second end 54a substantially encloses the inner volume 46a of the inner member 38a. The second end 54a also includes an opening 58a for accommodating the attachment member 50a. A guide pin 60a axially projects from the base 42a of the inner member 38a and is slidingly received in a hole 62a formed in the first end 52a of the outer housing 40a. A foam member 64a is interposed between the base 42a of the inner member 38a and the first end 52a of the outer housing 40a around the guide pin 60a to absorb loads directed on the control element 36a. The outer housing 40a is coupled to a first end 66a of cable 24a which is coupled to an anchor such as the feed tower 16 (see FIG. 1). The inner member 38a is secured to a second end 68a of the cable 24a which is coupled to the object to be damped or the remote portions 26 of the antenna 10.

A plurality of donut-shaped piezo-electric elements 86a are stacked within the inner volume 46a of the inner member 38a between the base 42a and second end 54a of the outer housing 40a. Each piezo-electric element 86a includes a central opening 88a formed therethrough for accommodating the attachment member 50a. An electric power amplifier 90a is coupled between the piezo-electric elements 86a and a power source 92a.

The power source 92a is coupled to the piezo-electric elements 86a via a microprocessor 96a The power source 92a also communicates with one or more of the sensors 28, deformation sensor 32 and/or strain sensors 34 (FIG. 1) by telemetry or a conventional wiring harness. As such, the microprocessor 96a controls the power source 92a in response to signals received from the motion control sensors 28, 32 and/or 34. Preferably, the characteristics of each motion control element 36a in the antenna structure is controlled independently by the microprocessor 96a to counter the lateral forces described above.

The voltage from the power source 92a amplified by the electric power amplifier 90a acts on the piezo-electric elements 86a. The mechanical force generated by the piezo-electric elements 86a are proportional to the strength of the electric field applied to the elements 86a. Thus, when the voltage from the power source 92a is varied, the mechanical force generated by the piezo-electric elements 86a are varied. When the force output of the piezo-electric elements 86a are varied, the motion control characteristics of the motion control element 36a are varied. The piezo actuator induces a variable mechanical force counteractive to a sensed force which results in variable damping in the structure. Thus, the motion control characteristics of the motion control element 36a are varied and controlled in response to the electric field supplied to the elements 86a in phase with the oscillations of the antenna 10.

Referring now collectively to FIGS. 1 and 3, in active damping control operation, the sensors 28, deformation sensor 32 and/or strain sensors 34 provide electrical signals to the microprocessor 96a indicative of the vibration conditions, i.e., level and frequency, experienced by the antenna 10. In response to the signals, i.e., feedback, the microprocessor 96a provides output signals to control the power source 92a and power amplifier 90a. The power source 92a and power amplifier 90a vary the magnitude of the voltage transmitted to the motion control elements 36a in response to the signals from the sensors 28, 32 and/or 34.

In response to the change in electric field, the piezo-electric elements 86a alter their output force in proportion to the changing electric field from the power source 92a. As such, the resistance to change along the length dimension of the motion control element 36a changes as the piezo-electric elements 86a engage the second end 54a of the outer housing 40a and the base 42a of the inner member 38a during application of a load. When this is done in phase with the oscillations detected by sensors 28, 32 and/or 34, the settling time of the antenna 10 can be greatly reduced.

Figure 4:
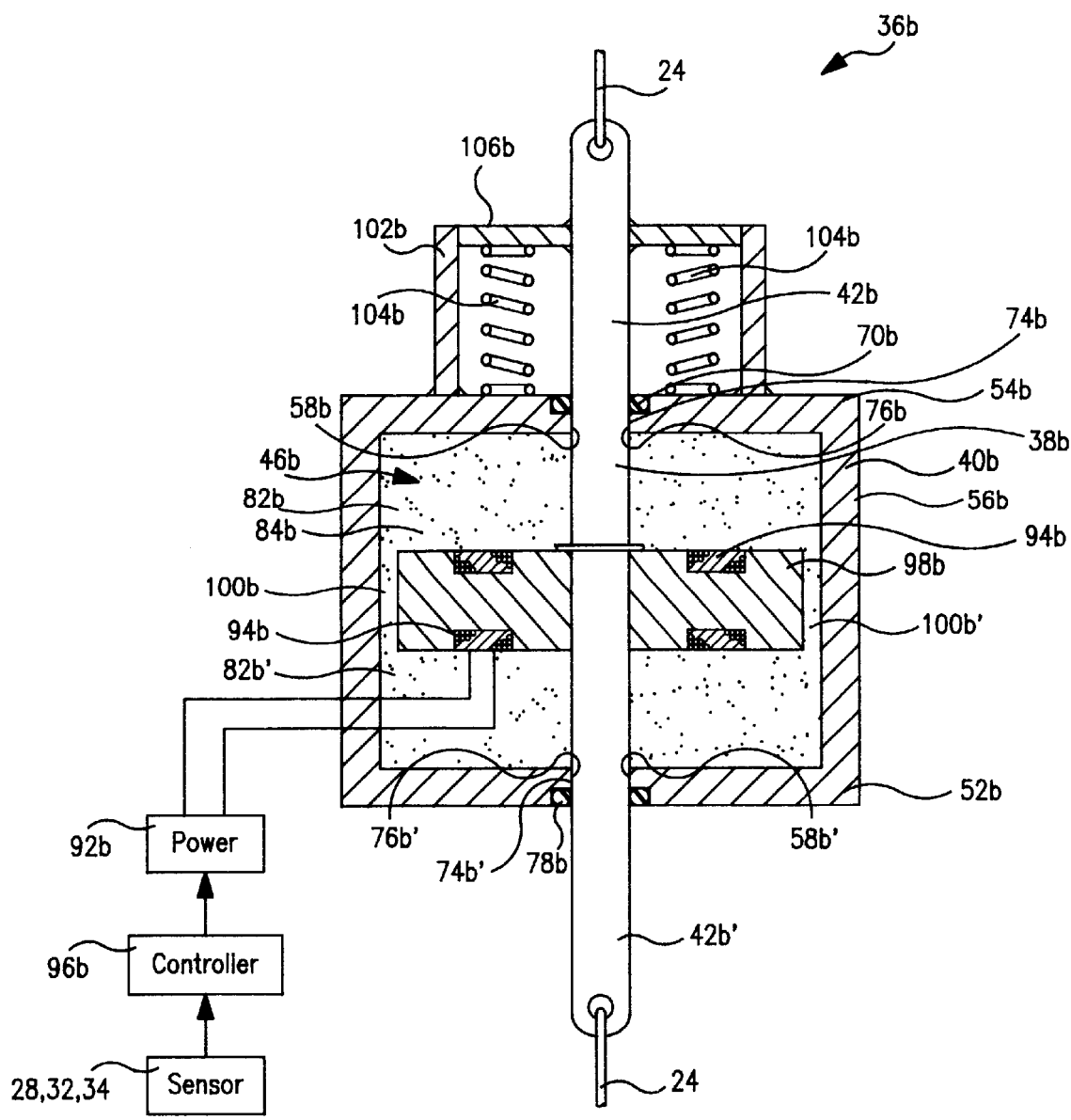
FIG. 4 is a cross-sectional view of a vibration control mechanism according to a third embodiment of the present invention.

Turning now to FIG. 4, a third embodiment vibration control element 36b is illustrated. The motion control element 36b includes an inner member 38b extending through an outer housing 40b. The outer housing 40b preferably comprises a circular first end 52b and a circular second end 54b interconnected by a cylindrical wall 56b. The second end 54b includes an opening 58b formed therein for accommodating a first end 42b of the inner member 38b. Similarly, the first end 52b includes an opening 58b' formed therein for accommodating a second end 42b' of the inner member 38b. Preferably, the inner housing 38b comprises a rod extending through the first end 52b and second end 54b of the outer housing 40b. The outer housing 40b is fixed to a preselected substrate such as the rib section 19 of the antenna 10 (see FIG. 1). The first end 42b of the inner member 38b is coupled to an object to be vibrationally controlled such as the remote portions 26 of antenna 10 via cable 24. Similarly, the second end 42b' of the inner member 38b is coupled to an anchor, such as the feed tower 16, by the opposite end of cable 24.

A first O-ring 70b is nested within the opening 58b so as to slidingly engage the outer surface 74b of the inner member 38b and the inner surface 76b of the outer housing 40b. Similarly, a second O-ring 78b is nested within the opening 58b' so as to slidingly engage the outer surface 74b' of the inner member 38b and the inner surface 76b' of the outer housing 40b.

A piston 98b laterally projects from the inner member 38b so as to divide the inner volume 46b into a first fluid chamber 82b and a second fluid chamber 82b' with first and second fluid passages 100b and 10b' between the piston 98b and cylindrical wall 56b interconnecting the first fluid chamber 82b and second fluid chamber 82b'.

A fluid 84b of the electro- or magneto-rheological type is disposed within the first and second fluid chambers 82b and 82b' and is transferrable therebetween through the fluid passages 100b and 100b'. An electro-magnet 94b is disposed on the piston 98b proximate the magneto-rheological fluid 84b for providing a magnetic field across the magneto-rheological fluid 84b. While an electro-magnet 94b is illustrating for controlling the magneto-rheological fluid 84b, it should be appreciated that a electrode surfaces could substitute therefore for working in conjunction with a fluid 84b of the electro-rheological type. Also, electro-magnet 94b could be replaced with permanent magnets if fixed motion control characteristics are desired.

An axially extending spring retainer 102b is coupled to the second end 54b of the outer housing 40b. A pair of springs 104b are disposed within the spring retainer 102b and abuttingly engage the second end 54b of the outer housing 40b and an annular flange 106b radially extending from the perimeter of the inner member 38b.

An electric power source 92b is coupled to the electro-magnet 94b via a microprocessor 96b. The microprocessor 96b also communicates with one or more of the sensors 28, deformation sensor 32 and/or strain sensors 34 (FIG. 1) by telemetry or a conventional wiring harness. As such, the microprocessor 96b controls the power source 92b in response to signals received from the motion control sensors 28, 32 and/or 34. Preferably, the characteristics of each motion control element 36b is controlled independently by the microprocessor 96b to counter the lateral forces described above.

The magnetic field from the electro-magnet 94b acts on the magneto-rheological fluid 84b and has a strength proportional to the voltage potential across electro-magnet 94b. The resistance to flow of the magneto-rheological fluid 84b is proportional to the strength of the magnetic field applied across the fluid 84b. Thus, when the voltage from the power source 92b is varied, the resistance to flow of the magneto-rheological fluid 84b is varied. When the resistance to flow of the magneto-rheological fluid 84b is varied, the damping characteristics of the motion control element 36b are varied. As the resistance to flow of the fluid 84b decreases, the damping rate of the motion control element 36b decreases. Likewise, as the resistance to flow of the fluid 84b increases, the damping rate of the damping element 36b increases. Thus, the motion control characteristics of the motion control element 36b are varied and controlled in response to the magnetic field applied to the fluid 84b.

As just described, one way to vary the strength of the magnetic field applied to the motion control element 36b is to vary the voltage potential across electro-magnet 94b. Another way to vary the strength of the magnetic field applied to the fluid 84b is to change the distance between the electro-magnet 94b and the fluid chambers 82b and 82b. Also, the size of the magnetic field can be changed by varying the area of the electro-magnet 94b which is in facing relationship. Accordingly, the actual configuration of the motion control element 36b may be selected to provide the desired damping characteristics corresponding to the specific application into which it is incorporated.

Referring now collectively to FIGS. 1 and 4, in active damping control operation, the inner member 38b moves relative to the outer housing 40b as the remote portions 26 of the antenna 10 experience oscillations. This causes the piston 98b to change its position within the inner volume 46b relative to the first end 52b and second end 54b thereby changing the volume of the first fluid chamber 82b and the second fluid chamber 82b. The sensors 28, deformation sensor 32 and/or strain sensors 34 provide electrical signals to the microprocessor 96b indicative of the vibration conditions, i.e., level and frequency, experienced by the antenna 10. In response to the signals, i.e., feedback the microprocessor 96b provides output signals to control the power source 92b. The power source 92b varies the magnitude of the voltage transmitted to the motion control elements 36b in response to the signals from the sensors 28, 32 and/or 34. In response to the change in magnetic field, the magneto-rheological fluid 84b changes its viscosity which alters the damping rate between the inner member 38b and the outer housing 40b by interfering with the piston 986 and first and second ends 52b and 54b of the outer housing 40b. When this is done in phase with the oscillations detected by sensors 28, 32 and/or 34, the settling time of the antenna 10 can be greatly reduced. The bias of the springs 104b against the annular flange 106b urges the inner member 38b to a pre-selected orientation relative to the outer housing 40b during and after damping by the motion control element 36b.

Figure 5:
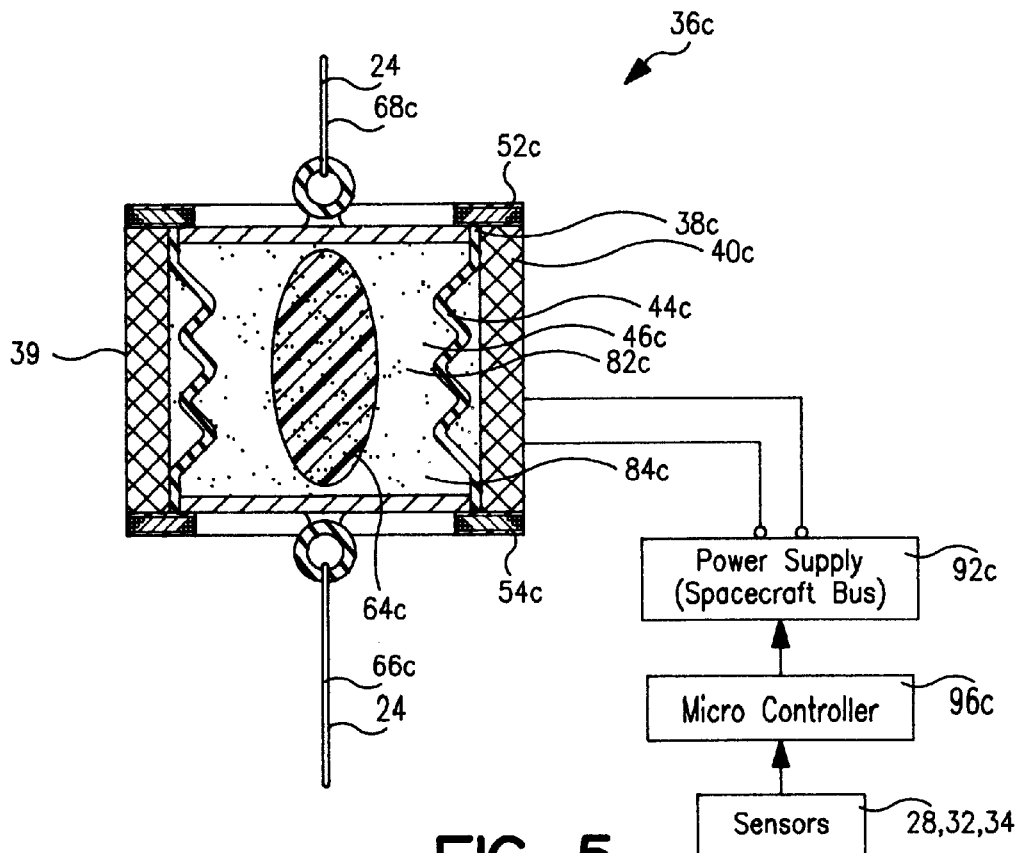
FIG. 5 is cross-sectional view of a vibration control mechanism according to a fourth embodiment of the present invention.

Turning now to FIG. 5, a fourth embodiment vibration control element 36c according to the present invention is illustrated. The motion control element 36c includes a non-conductive cylindrical inner housing 38c substantially residing within and axially aligned with an electro magnet 39. A pair of non-conductive end caps 52c and 54c retain the inner housing 38c within the electro magnet 39. The inner housing 38c includes a flexible (e.g., metal or rubber) bellows portion 44c forming a portion of its side wall which is free to expand and compress axially relative to the electro magnet 39. As such, expansion and compression of the inner housing 38c is accommodated by the flexing and collapsing of the flexible bellows portion 44c. The cable 24, which is connected at 66c and 68c to end fittings of the inner housing 38c, causes the inner housing 38c to elongate via the bellows 44c when a load is applied.

The inner volume 46c of the inner housing 38c forms a fluid chamber 82c filled with a fluid 84c of the electro- or magneto-rheological type. An electro-magnet 39 for providing a magnetic field is coupled to the outer housing 40c so as to surround or at least be on opposite sides of the inner housing 38c. A closed cell foam bladder 64c is disposed within the inner volume 46c of the inner housing 38c to absorb loads directed on the motion control element 36c while keeping the fluid 84c against the flexible bellows portion 44c. While an electro-magnet 39 is illustrated for controlling the magneto-fluid 84c, it should be appreciated that a coil could substitute therefore for working in conjunction with a fluid 84c of the electro-rheological type. Also, the electro-magnet 39 could be replaced with permanent magnets if fixed motion control characteristics are desired.

A power source 92c is coupled to the electro-magnets 39 via a microprocessor 96c. The power source 92c also communicates with one or more of the sensors 28, deformation sensor 32 and/or strain sensors 34 (FIG. 1) by telemetry or a conventional wiring harness. As such, the microprocessor 96c controls the power source 92c in response to signals received from the motion control sensors 28, 32 and/or 34. The characteristics of each motion control element 36c is controlled independently by the microprocessor 96c to counter the lateral forces described above.

The magnetic field acting on the magneto-rheological fluid 84c in the motion control element 36c has a strength proportional to the voltage potential across electro-magnet 39. The resistance to flow of the fluid 84c is proportional to the strength of the field applied across the fluid 84c in the inner volume 46c of the inner housing 38c. Thus, when the voltage from the power source 92c is varied, the resistance to flow of the fluid 84c is varied. When the resistance to flow of the fluid 84c in the inner volume 46c is varied, the damping characteristics of the motion control element 36c are varied. As the resistance to flow of the fluid 84c decreases, the damping rate of the damping element 36c decreases. Similarly, as the resistance to flow of the fluid 84c increases, the damping rate of the motion control element 36c increases. Thus, the damping characteristics of the motion control element 36c are varied and controlled in response to the field applied to the fluid 84c in the inner volume 46c.

As just described, one way to vary the strength of the field applied to the fluid 84c in the inner volume 46c is to vary the voltage potential across electro-magnet 39. Another way to vary the strength of the field applied to the fluid 84c in the inner volume 46c is to change the distance between the electro-magnet 39 and the fluid 84c in the inner volume 46c. Also, the size of the field can be changed by varying the area of the electro-magnet 39 which is in facing relationship. Accordingly, the actual configuration of the motion control element 36c may be selected to provide the desired damping characteristics corresponding to the specific application into which it is incorporated.

Referring now collectively to FIGS. 1 and 5, in active damping control operation, the sensors 26, deformation sensor 32 and/or strain sensors 34 provide electrical signals to the microprocessor 96c indicative of the vibration conditions, i.e., level and frequency, experienced by the antenna 10. In response to the signals, i.e., feedback, the microprocessor 96c provides output signals to control the power source 92c. The power source 92c varies the magnitude of the voltage transmitted to the motion control elements 36c in response to the signals from the sensors 28, 32 and/or 34. By controlling the power source 92c, the viscosity of the fluid 84c in the motion control elements 36c is controlled to increase or decrease the damping characteristics of the motion control elements 36c.

Thus, the present invention provides a motion control apparatus for damping spacecraft appendage oscillation. More particularly, the present invention interposes motion control elements in strategic locations within the appendage structure to damp oscillations. In one embodiment, the motion control elements utilize a combination of an electro- or magneto-rheological fluid having its viscosity changed according to the magnitude of an electric or magnetic field applied thereto and a piezo-electric which exert mechanical forces proportional to the magnitude of an electric field supplied thereto. In another embodiment, the motion control elements only utilize a piezo-electric stack. In yet other embodiments, the motion control elements only utilize electro- or magneto-rheological fluid. Although the present invention is particularly well suited for spacecraft appendage applications such as antennas, the present invention may also be beneficial in seismic vibration isolator systems for buildings, bridges, pipe and gas lines, aircraft and ships.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A vibration control apparatus comprising:
   an outer housing comprising a first end and a second end interconnected by a rigid wall;
   an inner housing disposed substantially within said outer housing and being moveable relative thereto, said inner housing including a fluid chamber, a base, and a lid interconnected by a bellows-type wall, said bellows-type wall lying adjacent said wall of said outer housing and enclosing said fluid chamber;
   a fluid disposed within said fluid chamber and engaging said inner housing, said fluid being selected from one of the group including electro- and magneto-rheological fluid; and
   an electric or magnetic field source disposed along said wall of said outer housing proximate said fluid and communicating with at least one sensor for varying a magnitude of said electric or magnetic field in phase with oscillations detected by said sensor.

2. The vibration control apparatus of claim 1 further comprising:
   an anchor attached to said base of said inner housing; and
   an object to be vibrationally controlled attached to said lid of said inner housing.

3. The vibration control apparatus of claim 1 wherein said sensor further comprises one of the group including deformation and strain sensors.

4. The vibration control apparatus of claim 1 wherein said electric or magnetic field source further comprises one of the group including an electro-magnet, a permanent magnet, a coil, and electrode surfaces.

5. The vibration control apparatus of claim 1 wherein said magnetic or electric field source is substantially cylindrical.

6. A vibration control apparatus comprising:
   an outer housing including a first non-conductive end cap, a second non-conductive end cap, and a rigid annular side wall extending between said first and second end caps;
   at least one of a magnetic and an electric field source disposed along opposite portions of said side wall;
   a non-conductive inner housing disposed within said side wall and being retained adjacent said field source by said first and second end caps, said inner housing including a flexible, bellows-type wall, a first end, and a second end defining a fluid chamber, said first end being coupled to an anchor and said second end being coupled to an object to be vibrationally controlled;
   a fluid of the electron or magneto-rheological type disposed within said fluid chamber and engaging said bellows-type wall of said inner housing;
   a power source coupled to said magnetic or electric field source;
   a controller electrically coupled to said power source and communicating with at least one sensor for changing the magnitude of said magnetic or electric field according to a level and phase of vibration detected by said sensor.

7. The vibration control mechanism of claim 6 wherein said magnetic or electric field source further comprises one of the group including an electro-magnet, a permanent magnet, a coil, and electrode surfaces.

8. The vibration control mechanism of claim 6 further comprising a foam member interposed between said first and second ends of said inner housing.

9. The vibration control mechanism of claim 6 wherein said at least one sensor further comprises one of the group including deformation and strain sensors.

10. The vibration control mechanism of claim 6 wherein said magnetic or electric field source is substantially cylindrical.

* * * * *